United States Patent
Hughes, IV

[19]

[11] Patent Number: 6,120,025
[45] Date of Patent: Sep. 19, 2000

[54] CONTROLLER GRIP FOR A VIDEO GAME MACHINE

[76] Inventor: Richard James-Patrick Hughes, IV, 30-35 31th St. Apt. 4A, Queens, N.Y. 11102

[21] Appl. No.: 09/059,831

[22] Filed: Apr. 14, 1998

[51] Int. Cl.[7] .................................................. A63B 71/00
[52] U.S. Cl. ............................................................ 273/148 B
[58] Field of Search .......................... 273/148 B; 463/36, 463/37, 38, 46, 47; 150/154, 165; D14/250; 379/451; 206/316.2, 315.1, 320; 224/908, 929

[56] References Cited

U.S. PATENT DOCUMENTS

| | | | |
|---|---|---|---|
| 4,312,458 | 1/1982 | Stewart | 150/154 X |
| 4,494,755 | 1/1985 | Caillouet, Jr. . | |
| 4,504,059 | 3/1985 | Weinrieb | 273/148 B |
| 4,901,852 | 2/1990 | King | 206/320 X |
| 5,025,921 | 6/1991 | Gasparaitis et al. | 150/165 X |
| 5,046,739 | 9/1991 | Reichow | 273/148 B |
| 5,207,426 | 5/1993 | Inoue et al. . | |
| 5,348,206 | 9/1994 | Scherer | 206/316.2 |
| 5,501,458 | 3/1996 | Mallory | 273/148 B |
| 5,551,497 | 9/1996 | Stanley . | |
| 5,551,693 | 9/1996 | Goto et al. . | |
| 5,591,006 | 1/1997 | DeMeo et al. . | |
| 5,626,527 | 5/1997 | Eberlein . | |
| 5,648,757 | 7/1997 | Vernace et al. | 206/320 X |
| 5,716,274 | 2/1998 | Goto et al. . | |
| 5,820,462 | 10/1998 | Yokoi et al. | 463/37 |

*Primary Examiner*—Raleigh W. Chiu

[57] ABSTRACT

A grip for a controller of a video game machine or video computer system that reduces slipping of the controller, increases the user's comfort and keeps the user's finger tips in proper position during use of the controller. The controller grip of the present invention provides a way to inexpensively, quickly and easily give a controller a different size, shape and/or ornamental design. The controller grip of the present invention has a covering material securable to the controller. The covering material is sized and configured to cover the controller in manner that the user has access to the controller's action control buttons and the selection control buttons.

19 Claims, 12 Drawing Sheets

CONTROLLER GRIP FOR A VIDEO GAME MACHINE

BACKGROUND OF THE INVENTION

1. Field on the Invention

The present invention relates to a controller grip for control devices and more specifically to a controller grip used by a player for operating a video game machine, video computer system, computer or the like.

2. Description of the Background Art

Various types of video game machines, video computer systems, computers and the like have been commercially developed for entertainment and education of the user. Exemplary video game machines contemplated by the invention include those manufactured by Sony Corporation under the name Sony PlayStaion, Nintendo Company, Ltd. under the name Nintendo 64, and Sega Enterprises Ltd. under the name Sega Saturn. Additionally, numerous companies provide video game applications for running on personal computers.

Typically the video game machines discussed above include a controller which comprises a housing, action control means, selection control means and a controller wire. The end of the controller wire includes a connector which is engageable with a video game machine. Many of these controllers are of the type having a left section and a right section for holding, with the user's left and right hands, respectively. Other controllers have a left handle section, a center handle section and a right handle section where the user holds two of the sections during operation of the video game. U.S. patents that disclose manual controllers for video game machines include U.S. Pat. Nos. 5,207,426, 5,551,693 and 5,716,271.

However, such controllers for video games suffer from a number of problems.

It has been observed that during periods of extended use, the user's hands perspire. Controllers made of plastic or similar materials become slippery as moisture accumulates on the user's hands. The user's performance is diminished as it becomes more difficult to grasp the slippery controller. In fact, the controller may slide out of the user's hands during use. After periods of extended use of a controller, the hard surface of the controller's housing can become painful to the user and can cause hand cramps and muscle fatigue. It would be useful to have a controller with a non-slip and comfortable grip.

It has also been observed that another problem with the controllers is that they are not personalized to the user. The user must use a controller with the particular shape, color and ornamental design of the controller supplied by the manufacturer. If the shape of a controller does not readily conform to the user's hands, the user will be uncomfortable with the controller and the user's performance will be diminished. Since users have different preferences toward the shape, color and ornamental design of controllers, it is useful to have a means to inexpensively and quickly provide these different preferences on a controller.

SUMMARY OF THE INVENTION

In view of the aforementioned problems with controllers, the present invention is directed to a novel grip for a controller of a video game machine. In one embodiment of the present invention the controller grip is comprised of an integrally formed covering material securable to the controller, the covering material being sized and configured to cover the controller in a manner that the user has access to the controller's action control buttons and selection control buttons.

In another embodiment of the present invention the controller grip is comprised of a covering material having a first covering material for the left section of the controller and a second covering material for the right section of the controller.

In another embodiment of the present invention the controller grip is comprised of a covering material having a first covering material for the left section of the controller, a second covering, material for the right section of the controller, and a third covering material for the center section of the controller.

In another embodiment of the invention the controller grip has contour grooves that conform to a user's fingers.

In another embodiment of the invention the controller grip has finger straps to support the back of a user's fingers.

In another embodiment of the invention the controller grip has means for providing gripping support to facilitate gripping of the controller grip.

It is therefore an object of the present invention to provide a grip for the controller of a video game machine or computer system that can be readily secured to the controller and provide a non-slip grip for the user, enabling more effective use of the controller and increasing the user's performance.

Another object of the invention is to provide a grip for the controller of a video game machine or computer system that can be readily secured to the controller and provide a comfortable grip by the user, enabling more effective use of the controller and increasing the user's performance.

Another object of the invention is to provide a grip for the controller of a video game machine or computer system that can be readily secured to the controller and that provides proper positioning of the user's fingers and prevents the user's fingers from moving out of position during operation of the controller.

Another object of the invention is to provide an inexpensive way of giving a controller a different shape, color and ornamental design. A further object of the invention is to provide a way to quickly and easily give a controller a different shape, color and ornamental design.

An additional object of the invention is to provide an additional layer of protection for the controller.

The foregoing and other objects, features and advantages of the present invention will become more apparent from the following detailed description of the present invention, appended claims and accompanying drawings.

DETAILED DESCRIPTION OF THE INVENTION

The terms used herein are intended to have the broadest meaning, as would be understood by persons of ordinary skill in the art to which this invention pertains. In particular, the terms are intended to include the meanings set forth below.

As used herein, the term "video game machine" means any device used to play video games including the Sony PlayStation, Nintendo 64, Sega Saturn, a personal computer and a network computer. The term "controller" means any device used to control the action in a video game machine. The term "button" means any input mechanism commonly used in controllers including joystick, track ball or switch type mechanisms.

Figure 1:
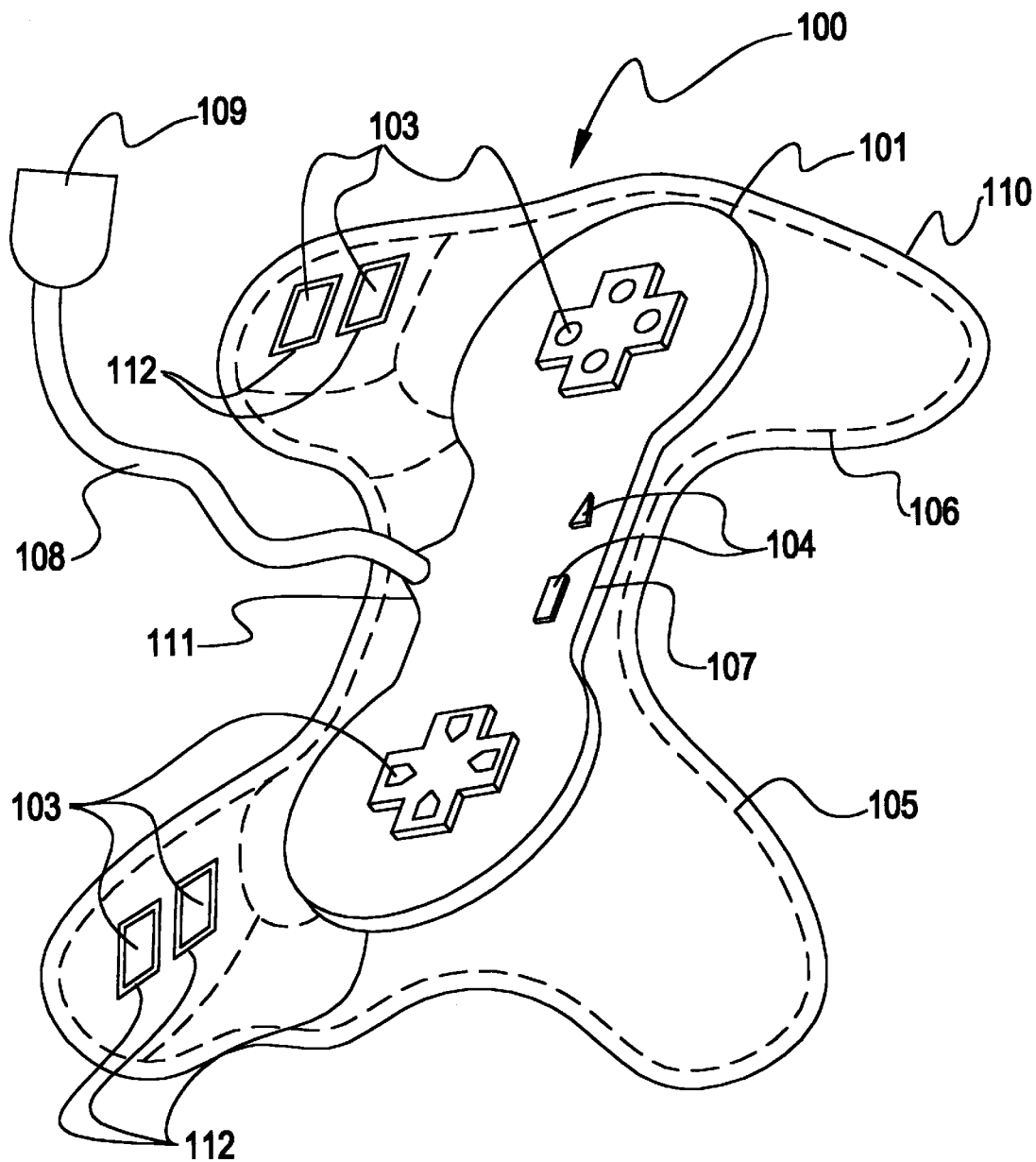
FIG. 1 is a perspective view of a controller grip in accordance with one embodiment of the present invention engaged with a controller for a video game.

FIG. 1 is a perspective view of a controller grip 100 engaged with a controller 101 for a video game machine in accordance with one embodiment of the present invention. The controller 101 includes various action control buttons 103 and selection control buttons 104. One skilled in the art will recognize that for some video game applications the selection control buttons may be used to control the action within the game. The controller 101 can generally be described as comprising a left section 105, a right section 106 and a central section 107 connecting the left section 105 to the right section 106. The controller also includes a controller wire 108. The end of the controller wire 108 has a connector 109 which is engageable with a video game machine (not shown in drawings).

The controller grip 100 comprises a covering material 110 securable to the controller 101. As depicted in the embodiment of FIG. 1, the size and shape of the covering material 110 may conform to the size and shape of the controller. The covering material 110 of the controller grip 100 of FIG. 1 is designed so that the covering material 110 is integrally formed to cover a significant portion of the controller. The covering material may contain openings or cut-out portions 112 to allow access to the action control buttons 103 and the selection control buttons 104. A U-shaped cut-out portion 111 of the covering material allows access for the controller wire 108. Alternatively, a closed loop cut-out portion could be provided for the controller wire 108. To install the controller grip on such an embodiment, the connector 109 must be put through the closed loop cut-out portion and the controller grip pulled through the length of the controller wire toward the controller 101.

Figure 2:
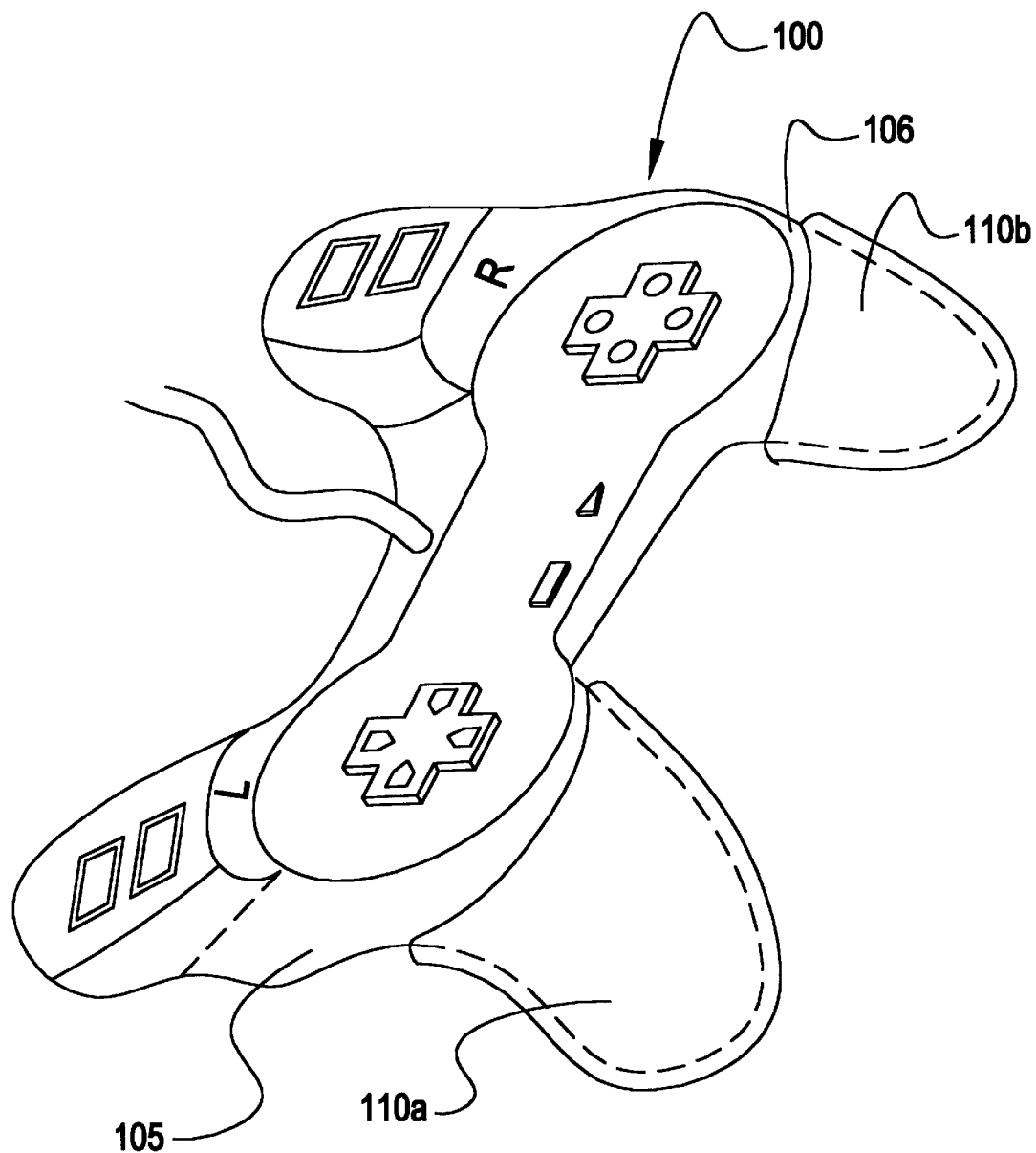
FIG. 2 is a perspective is view of a controller grip in accordance with another embodiment of the present invention engaged with a controller for a video game.

FIG. 2 shows an alternative embodiment of the invention. In this embodiment the controller grip 100 comprises a first covering material 100a and a second covering material 110b. The first covering material 110a and the second covering material 110b are of appropriate size and shape to cover the left section 105 and the right section 106 of the controller, respectively.

Figure 3:
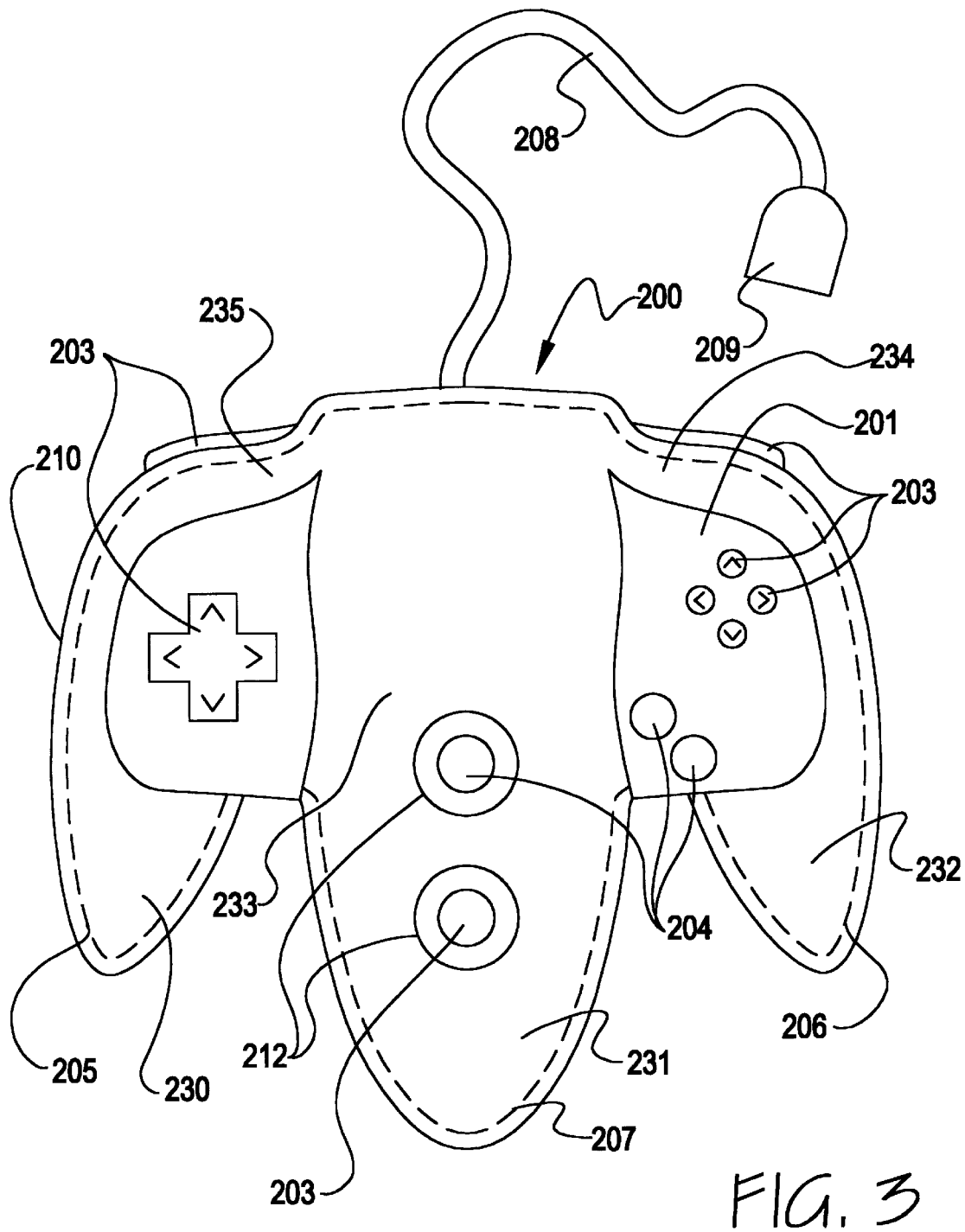
FIG. 3 is a front view of a controller grip in accordance with another embodiment of the present invention engaged with a controller for a video game.
Figure 3A:
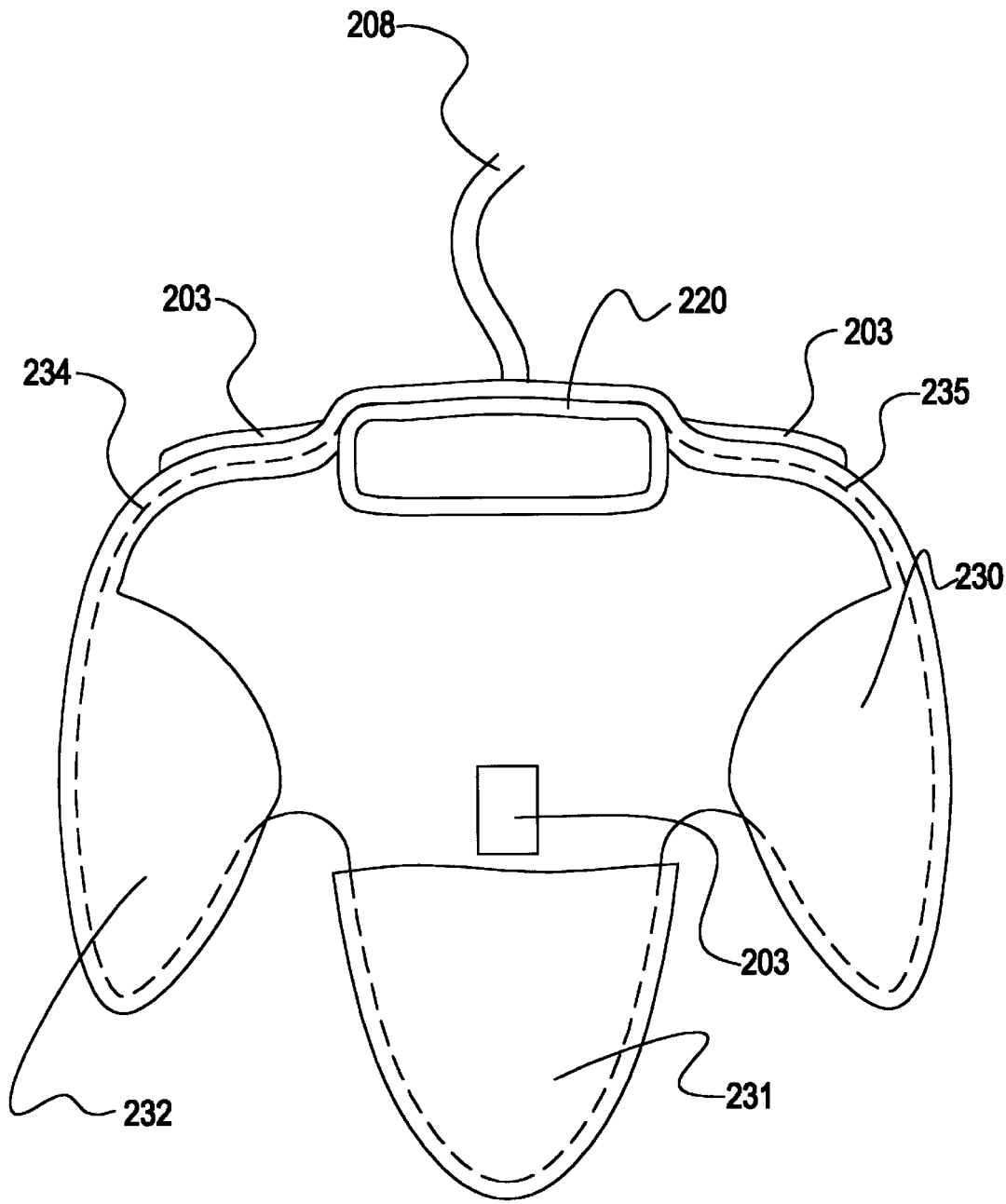
FIG. 3a is a back view of the controller grip shown of FIG. 3.

As shown in FIGS. 3–6a, video game controllers come in sizes and shapes other than the one discussed above. FIG. 3 shows a front view of a controller 201 with a housing having a left handle section 205, a right handle section 206 and a center handle section 207. The controller 201 also contains various action control buttons 203 and selection control buttons 204. The controller also includes a controller wire 208. The end of the controller wire has a connector 209 which is engageable with a video game machine (not shown in drawings). As shown in FIG. 3a the back of the controller includes a cartridge receptacle 220.

FIG. 3 shows an embodiment of a controller grip 200 having an integrally formed covering material 210 securable to the controller 201. In this embodiment, the size and shape of the covering material 210 is designed so that it covers a significant portion of the controller 201 that will be held by the user. In this embodiment, the covering material 210 comprises a first portion 230 for covering the left handle section 205 of the controller, a second portion 232 for covering the right handle section 206 of the controller and a third portion 231 for covering the center handle section 207 of the controller. Attached to the third portion 231 is a strap portion 233. The back end of the strap portion 233 is attached to one end of a right wrap around portion 234 and to one end of a left wrap around portion 235. The other end of the left wrap around portion 235 is attached to the first portion 230 of the covering material. The other end of the right wrap around portion 234 is attached to the second portion 232 of the covering material. The covering material contains openings or cut-out portions 212 of the covering material to allow access to the action control buttons 203 and the selection control buttons 204.

Figure 3B:
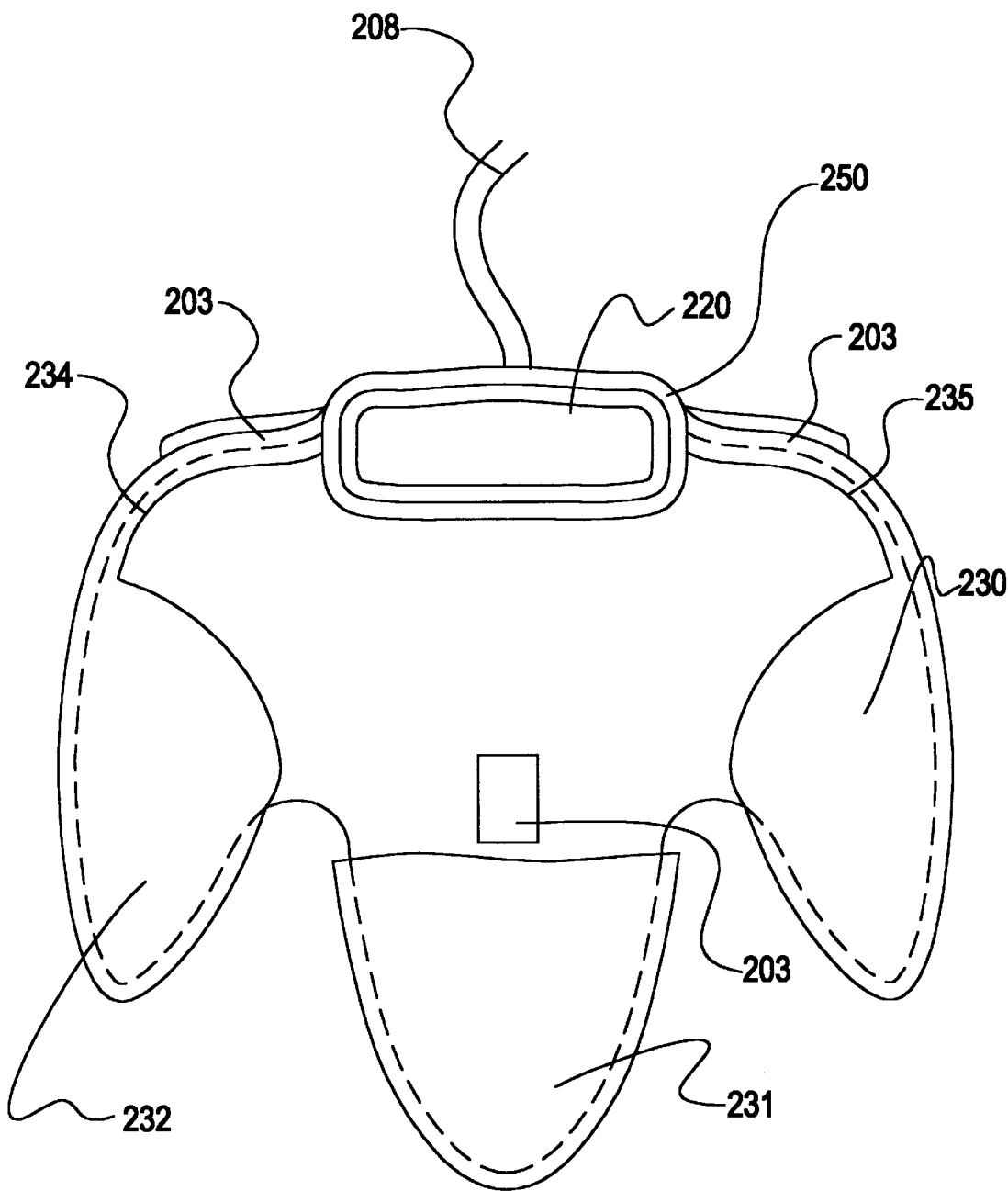
FIG. 3b is a back view of a controller grip engaged with a controller, the controller grip having a strap portion forming a loop that engages with the cartridge receptacle.

FIG. 3b shows a side view of an embodiment of the present invention that has a portion of the covering material engageable with the cartridge receptacle 220. In this embodiment the back end of the strap portion 233 is shaped to form a loop 250. The loop 250 engages the cartridge receptacle 220. The loop may be formed as a closed cut-out portion of the covering material or by fastening together two strap portions of the covering material.

Figure 5:
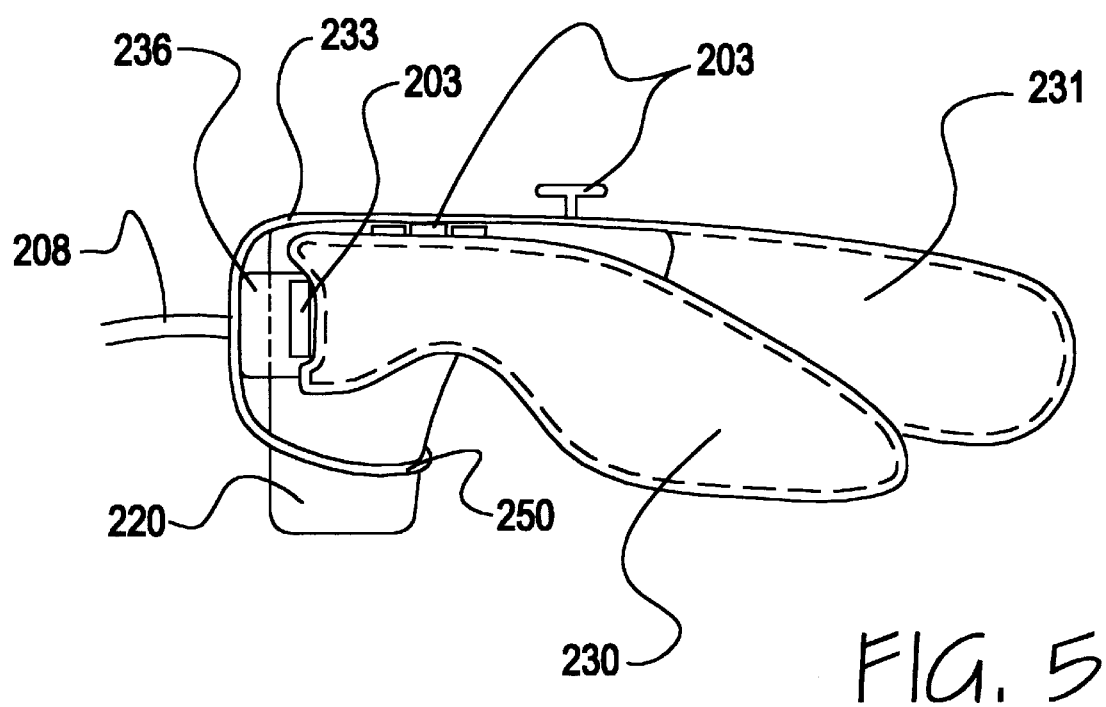
FIG. 5 is a side view of a controller grip engaged with a controller, the controller grip having a strap portion engaged with the cartridge receptacle.

FIG. 5 shows a side view of another embodiment of the present invention that has a portion of the covering material engageable with the cartridge receptacle 220. In this embodiment, a single wrap around portion 236 connects the first portion 230 of the covering material to the second portion 232 (not shown in FIG. 5) of the covering material. In the embodiment of FIG. 5, the strap portion 233 goes over the wrap around portion 236 and the loop 250 engages with the cartridge receptacle 220.

Figure 4:
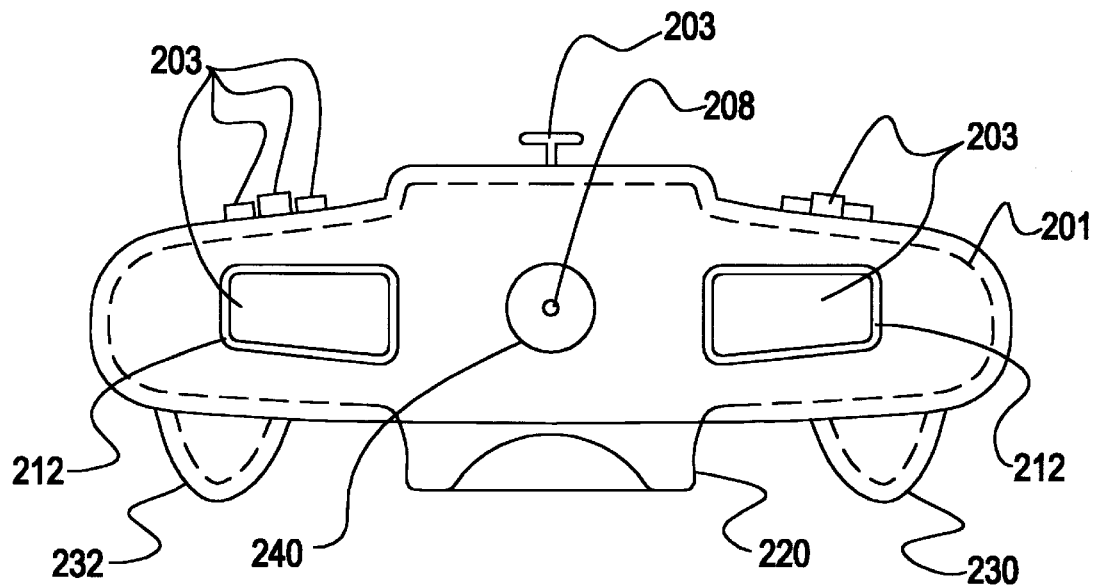
FIG. 4 is a side view of the controller wire end of the controller grip of FIG. 3
Figure 4A:
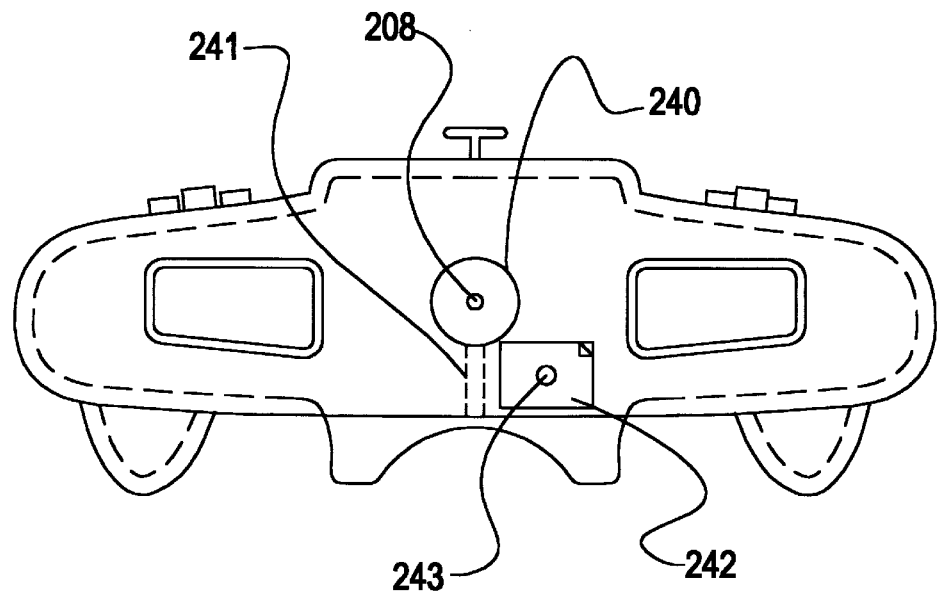
FIG. 4a is a side view of an alternative embodiment of the controller wire end of a controller grip.

As shown in the embodiment of FIG. 4, a cut-out portion 240 could be provided for the controller wire 208. To install the controller grip on this embodiment of the invention, the connector 209 (not shown in FIG. 4) must be put through the cut-out portion 240 and the controller grip 200 pulled through the length of the controller wire 208 toward the controller 201. Alternative embodiments of the invention can be employed in which the controller grip can be secured to a controller without running the controller grip through the length of the controller wire. For example, the cut-out portion could include an opening which allows access by the controller wire. As shown in the alternative embodiment of FIG. 4*a*, the opening portion may be covered. In this embodiment the cut-out portion 240 includes an opening 241 for moving the controller wire 208 into the cut-out portion 240. The covering material includes a tab portion 242 with a snap-on button 243 that crosses over the opening 241 and engages the covering material on which the reciprocal end of the snap-on button is affixed. Alternatively the tab portion 242 could be fastened to the covering material by other adhesive means such as hook and loop fastening, strips (commonly sold under the trademark "Velcro").

Figure 6:
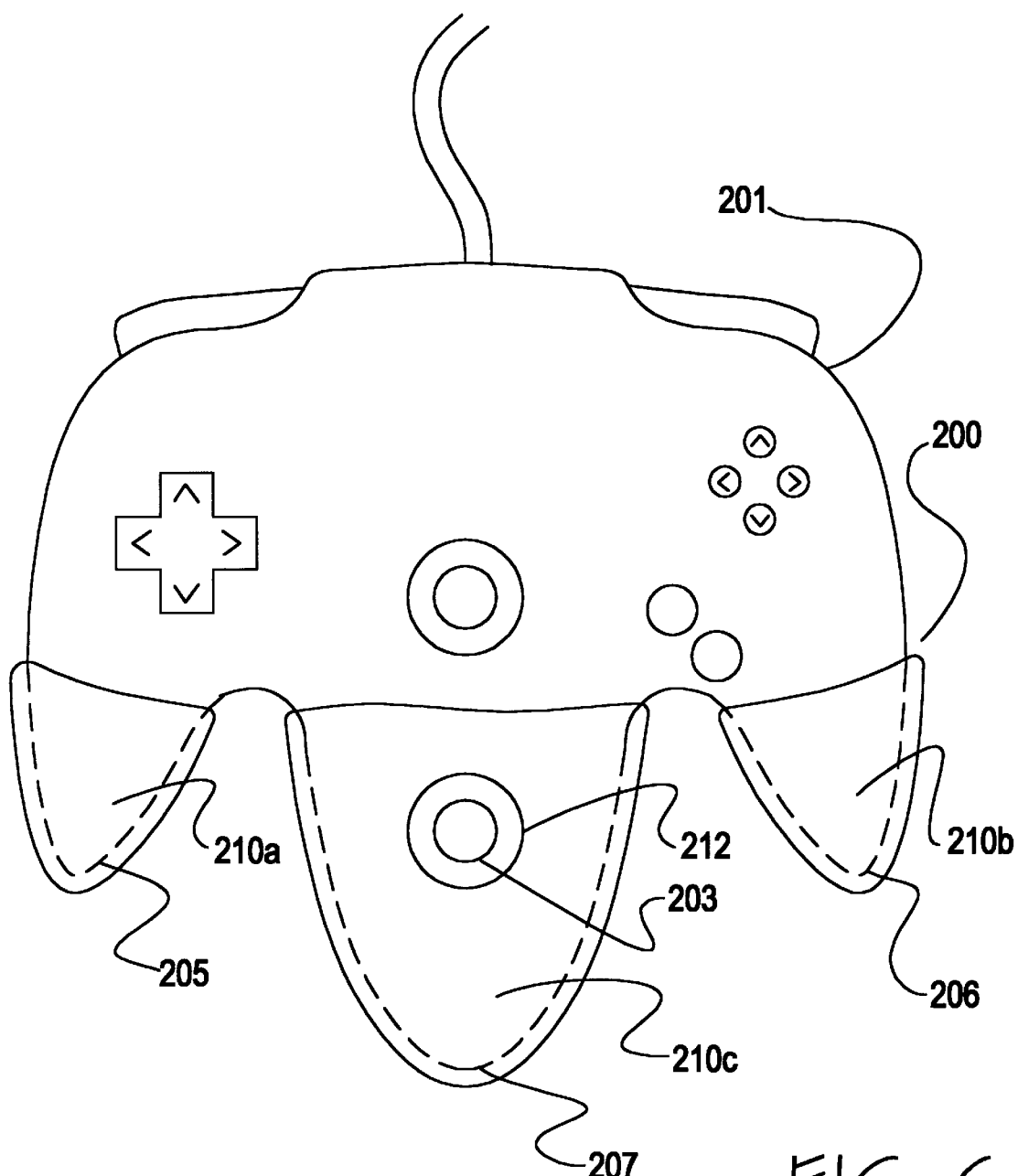
FIG. 6 is a front view of a controller grip in accordance with another embodiment of the present invention engaged with a controller for a video game.
Figure 6A:
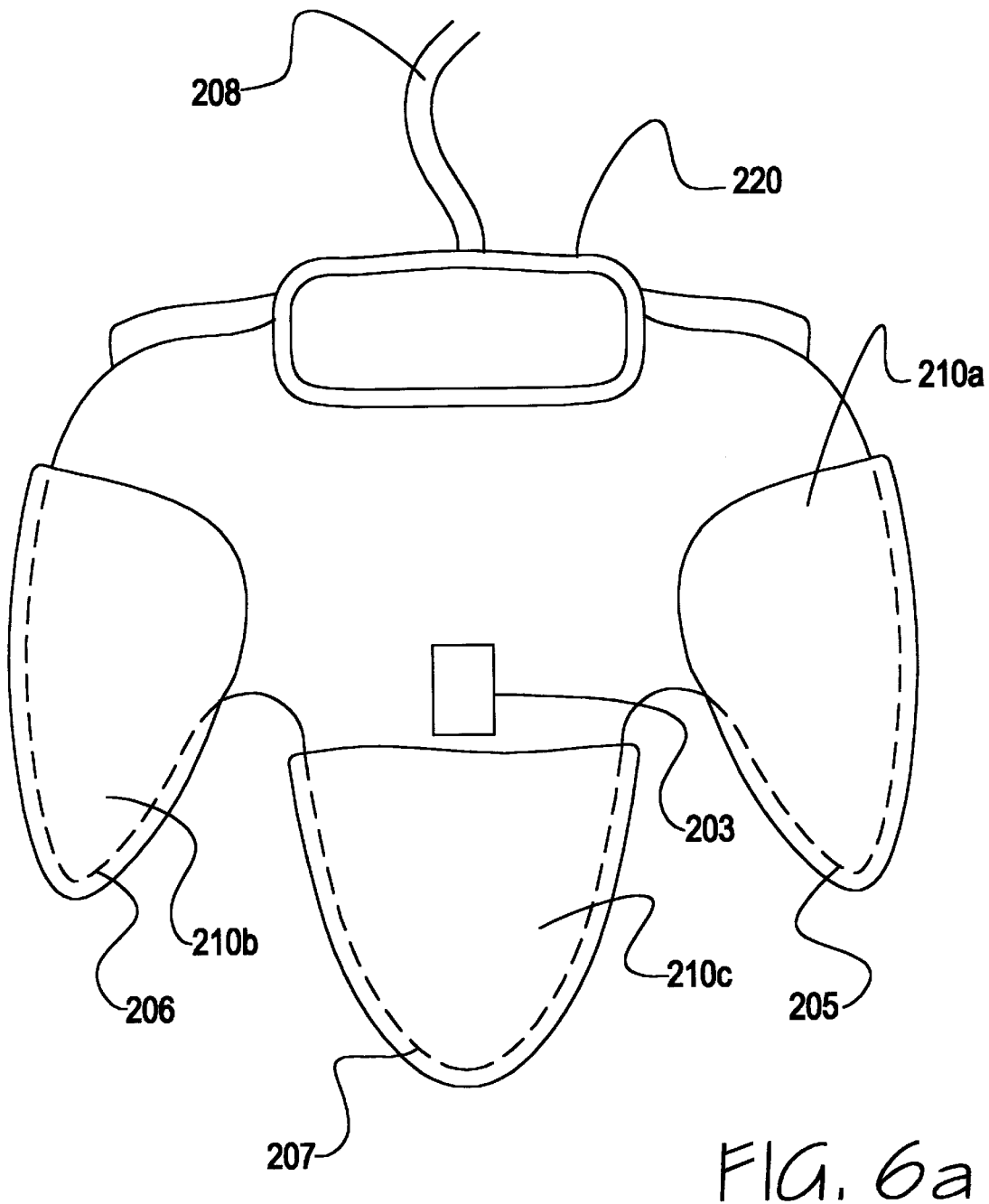
FIG. 6a is a back view of the controller grip shown of FIG. 6.

FIG. 6 and FIG. 6*a* show the front and back view, respectively, of another embodiment of the invention. In this embodiment the controller grip 200 comprises a first covering material 210*a*, a second covering material 210*b* and a third covering material 210*c*. She first covering material 210*a*, the second covering material 210*b* and the third covering material 210*c* are of appropriate size and shape to cover the left handle section 205, the right handle section 206 and the center handle section 207 of the controller, respectively.

The thickness of the covering material of the present invention may be uniform or may vary throughout the controller grip. The thickness of the covering material can range anywhere from about one millimeter to about six centimeters. The thickness of the covering material will depend upon the size of the user's hands and the user's particular preferences in the shape of the controller grip. The thickness of one embodiment of the present invention could be determined by a user placing his or her finger tips on the control buttons in a position in which the user is most comfortable. The user's hands and the controller could be used as a mold to determine the thickness of the covering material. For mass producing controller grips of various shapes, a manufacturer would select the thicknesses that satisfied the needs of the greatest numbers of consumers.

One skilled in the art can readily appreciate how the present invention improves a user's performance of a video game controller by putting a user's fingers in their proper position, preventing the user's fingers from coming out of position during operation of the controller and freeing the user's finger tips to operate the control buttons. During the operation of a video game machine, a user has to make various combinations of rapid finger movements. The controller grip can be designed to allow precise positioning of a user's fingers. The precise positioning for a user will be determined by the size of the user's hands as well as the user's particular style in operating a controller. The controller grip fills in the empty space between the user's hands and the controller so that the user's fingers will be positioned for maximum effectiveness of the control buttons. The controller grip allows a user to have his or her finger tips positioned directly over the control buttons. Also, by enabling the user to better grasp the controller with the base of the user's fingers and palms, the user's finger tips are freer to activate the control buttons. Additionally, the controller grip prevents a user's hands from moving out of position during operation of a controller. Regardless of the amount of movement of a user's arms, hands and fingers, the user's fingers will always be in their proper position.

Various types of materials can be used for the covering material of the controller grip. Suitable materials for the covering material include leather, rubber, neoprene, vinyl and cloth. The covering material can be made of a single material or can comprise multiple layers such as a leather layer covering a rubber layer. The covering material of the controller grip allows a user to obtain a comfortable grip of the controller. A covering material with a resilient cushion surface may provide extra comfort for the user. When the user is comfortable with his or her grip, the user can more effectively use the controller and increase his or her performance.

The covering, material can be made of a material on which ornamental designs can be more easily applied than the plastic housing typically used in controllers. Thus, the controller grips can be inexpensively manufactured with different colors or ornamental designs. For example, controller grips could be produced bearing designs of different logos or the names and colors of popular sport teams.

Covering materials with elastic properties such as rubber and neoprene can be elastically secured to the controller. Elastic material can be molded by processes well known to those skilled in the art. When elastically securing the covering material to the controller, the covering material should be designed so that in its relaxed state the covering material is smaller in size than the controller. The covering material can be stretched over the controller, and the elasticity of the covering material will secure the covering material to the controller.

Figure 7:
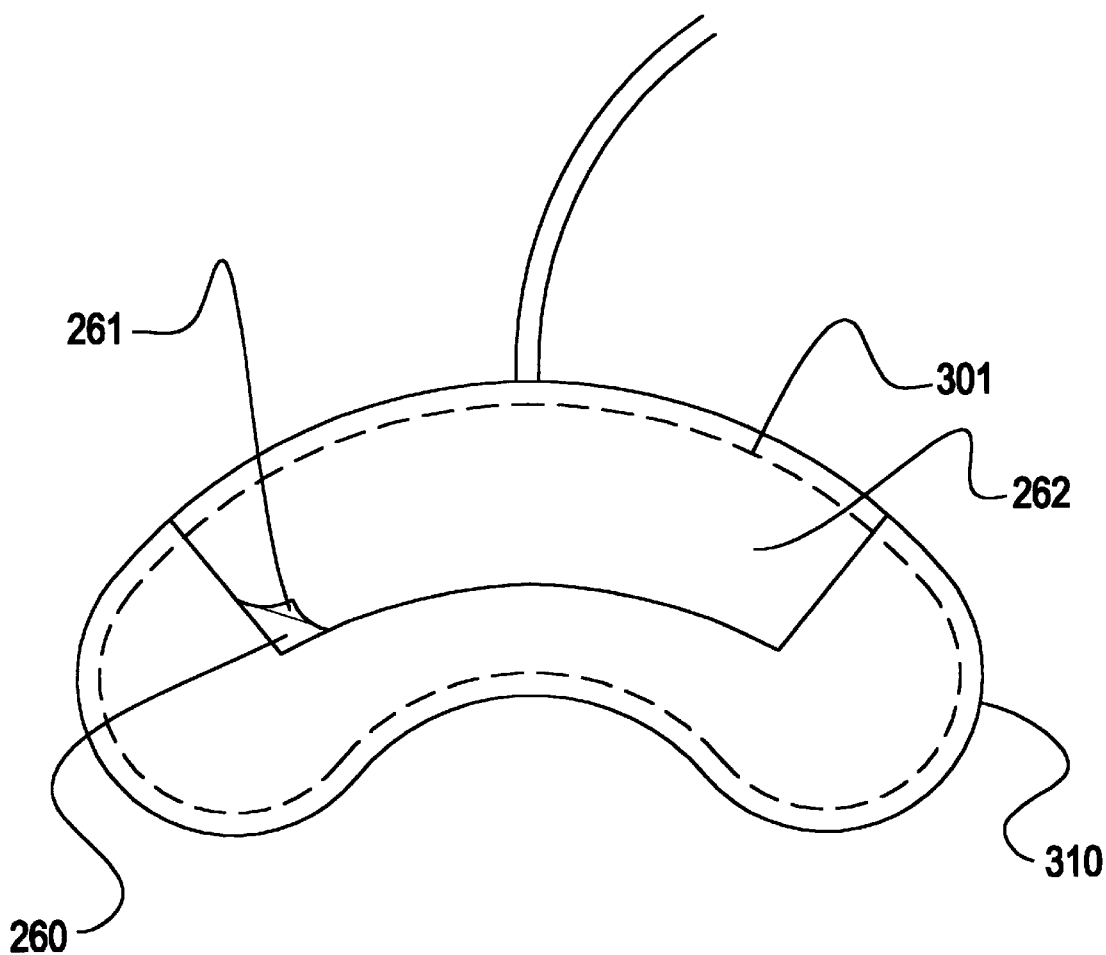
FIG. 7 is a back view of another embodiment of the controller grip secured to a controller with hook and loop fastening strips.

Other means of securing the covering material to the controller include hook and loop fastening strips, snap-on buttons and adhesive or glue. FIG. 7 shows the back view of an embodiment of the invention secured to a controller 301 using a hook fastening strip 260 and a loop fastening strip 261. The hook fastening strip 260 is affixed to a section of the covering material 310. The loop fastening strip 261 is affixed to an overlap section 262 of the covering material 310. The overlap section 262 of the covering material is designed to correspond to the section of the covering material containing the hook fastening strip 260. By firmly pressing together the hook fastening strip 260 and loop fastening strip 261, the covering material 310 can be quickly and easily secured to the controller. Likewise, the covering material can be quickly and easily disengaged from the controller by simply separating the hook fastening strip 260 and loop fastening strip 261. The hook and loop fastening strips can be affixed to various sections of the covering material. Preferably, the hook and loop fastening strips are affixed to the back of the controller so as not to interfere with the user's operation of the controller.

The covering material can be secured to the controller by applying an adhesive between the covering material and the controller. For example, a hook fastening strip can be affixed to the controller and corresponding loop fastening strips can be affixed to the covering material. Similarly, adhesive tape or glue can be applied to a portion of the covering material and secured to a controller by pressing the adhesive portion of the covering material to the controller.

The controller grip can be secured permanently or removably to the controller. Preferably, the controller grip is removably secured to the controller so the controller grip can be readily removed from a controller and secured to the controller at a later time. By removably securing the controller grip to a controller, a user with a preference for a particular controller grip can quickly and easily modify the controller grip to suit his or her particular preferences.

One can readily appreciate how the present invention provides an inexpensive way of giving a controller a different shape, color and/or ornamental design. It is much more economical to change the controller grip of the present invention than to change the entire controller. The video game controller includes electronic and other intricately arranged components. The controller is more expensive to manufacture than a controller grip. Users will be more likely to afford controller grips in various shapes, colors and ornamental designs, and less likely to afford controllers in various shapes, colors and ornamental designs. With the present invention, a family that uses a video game machine can have a pair of controllers with a variety of controller grips. For example, the adult members of the family can use a large controller grip and the younger members of the family can use a small controller grip. A user may even prefer to use different shape controller grips depending upon the particular game he or she is playing. In addition to selecting different shapes, each member of the family can choose a controller grip that suits his or her preference in color and design.

Furthermore, because of the lower cost of manufacturing controller grips, manufacturers will be more likely to produce a wider selection of shapes and designs of controller grips than the selection available for controllers. With a wider selection of controller grips, a user is more likely to find one the suits his or her particular preferences.

The present invention also provides a quick and easy way of giving a controller a different shape, color and/or ornamental design. In order to change the shape, color or ornamental design of a controller, the user must walk over to the video game machine, unplug the controller wire and plug in the wire for the controller that meets the user's preferences. It is quicker and easier to use the same controller and simply change the controller grip on the controller.

The controller grip of the present invention gives a user easy portability of his or her favorite controller configuration. The controller grip can easily be transported to a remote location. Once the user is at his or her destination, he or she can quickly and easily modify the controller to suit his or her preferences.

The present invention further provides an additional layer of protection for the controller. Controllers typically undergo a great deal of abuse. In addition to normal wear and tear. Controllers are often dropped, thrown and stepped on. As a result, controllers are often damaged—in both appearance and in operation. The controller grip of the present invention protects the controller from both external and internal damage.

Figure 8:
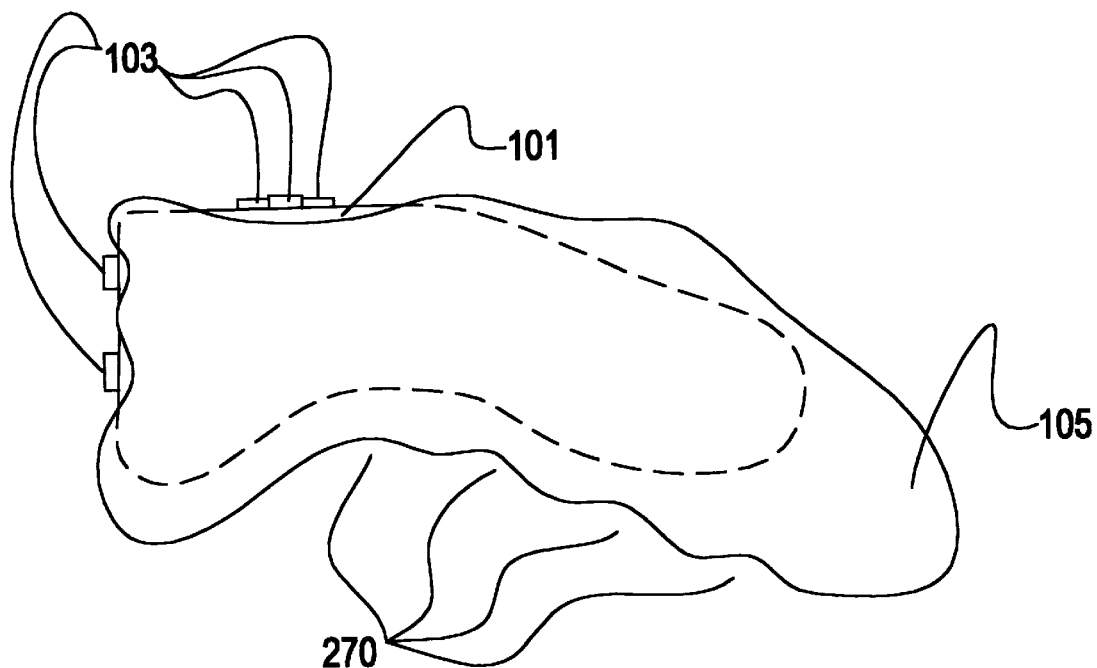
FIG. 8 is a side view of a controller grip having finger grooves in accordance with another embodiment of the invention.

The embodiments of the controller grip disclosed above are less likely to slip during use than a controller without a controller grip. Additionally, these embodiments of the controller grip are more comfortable than a controller without a controller grip. FIGS. 8–11 disclose additional embodiments of the controller grip that further improve the non-slip characteristic and comfort of the controller grip. FIG. 8 shows an embodiment of the invention that includes finger grooves 270 designed to conform to a user's fingers. These finger grooves 270 allow the user to obtain and maintain a stable grasp of the controller. Therefore, the controller is less likely to slip or move during use of the controller, enabling more effective use of the controller and increasing the user's performance. In addition, the finger grooves 270 allow for a more ergonomic grasp of the controller. Thus, the finger grooves 270 provide additional comfort and help reduce hand cramps and muscle fatigue.

Figure 9:
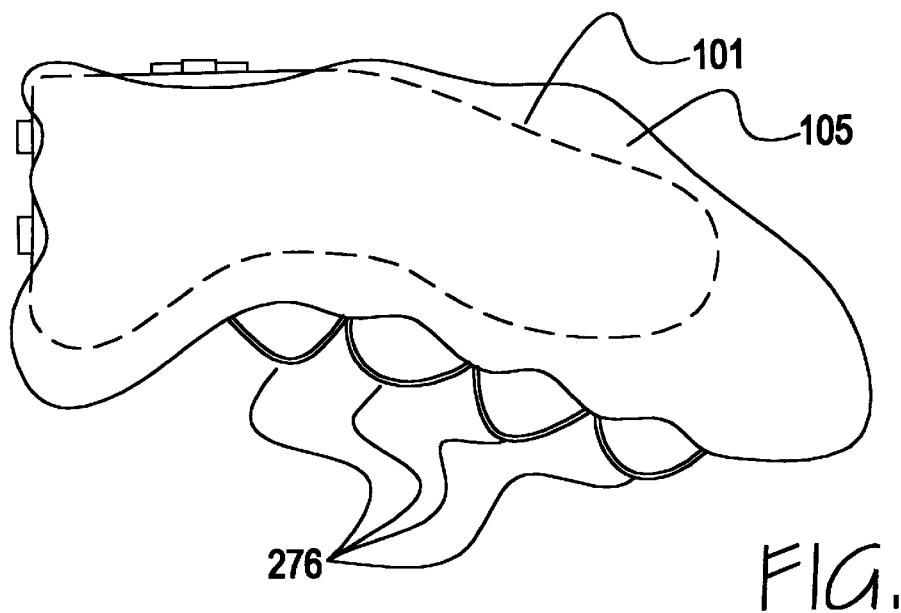
FIG. 9 is a side view of a controller grip having finger straps in accordance with another embodiment of the invention.

FIG. 9 shows an embodiment of the present invention that uses finger straps 276 to support the back of a user's fingers. The finger straps 276 are comprised of a layer of material such as leather, rubber neoprene, vinyl or cloth. The finger straps 276 are affixed to the back of the covering material 105 forming loops. The user inserts his or her fingers in the loops, i.e., between the finger straps and the covering material. Alternatively, a single finger strap could be affixed to a covering material wherein the user inserts multiple fingers in the loop. By securing the base of the user's fingers to the controller, the user's finger tips can more freely operate the control buttons.

Figure 10:
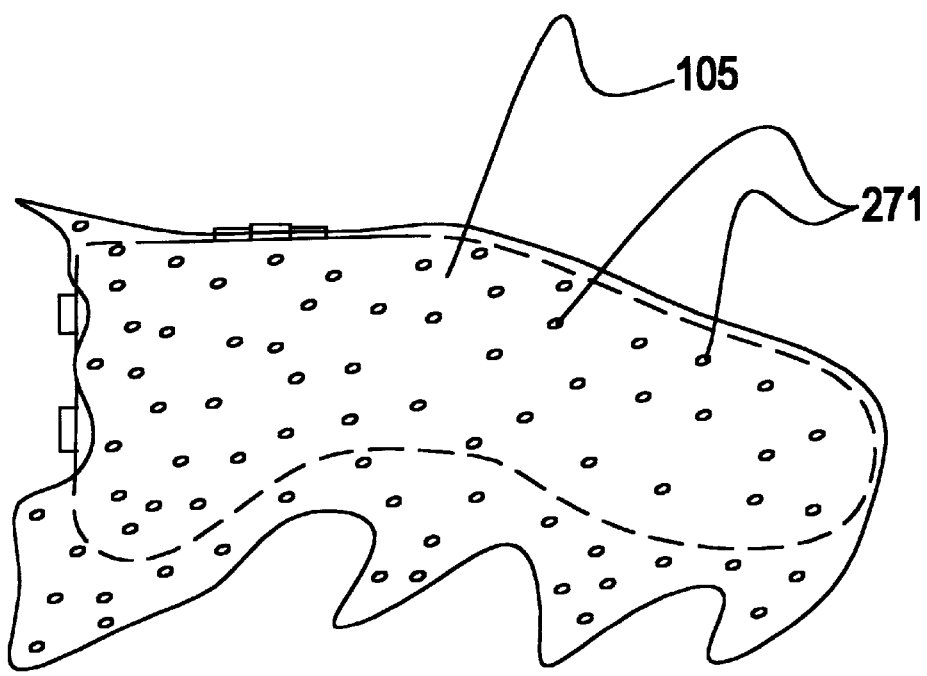
FIG. 10 is a side view of a controller grip having bumps distributed on the covering material in accordance with another embodiment of the invention.
Figure 11:
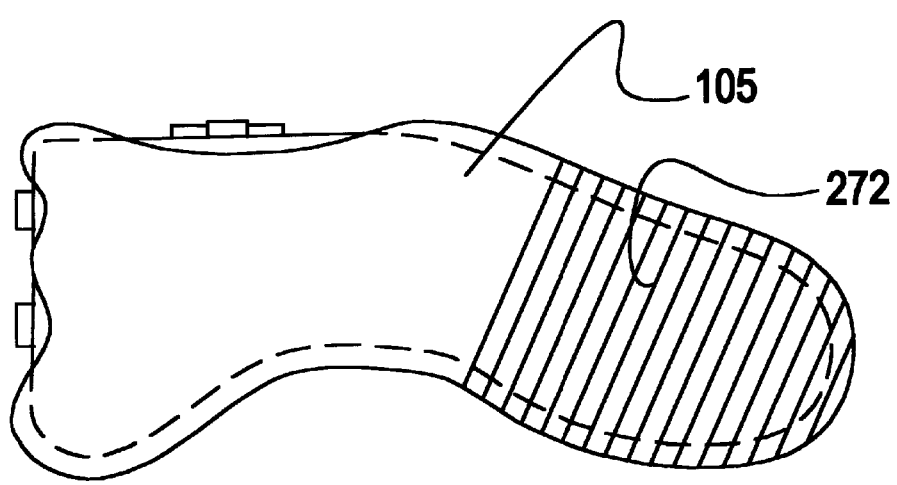
FIG. 11 is a side view of a controller grip having circular indentations in accordance with another embodiment of the invention.

Some gripping support means that facilitate gripping of the controller grip are disclosed in FIGS. 10 and 11. FIG. 10 shows a controller grip that contains small bumps 271 distributed throughout the covering material. FIG. 11 shows a controller grip that contains circular indentations 272 on the covering material. Other gripping support means (not shown in the drawings) include any raised or notched configurations distributed on the covering material. The gripping support means further improves a user's grasp of the controller grip and decreases the adverse effects of moisture on the user's hands. The improved grasp decreases slippage of the controller and increases a user's performance and comfort.

It will be understood by those skilled in the art that the details of the invention described in relation to the embodiments above are given by way of example only, and changes to the features offered and particularly to the shape of the controller grip can be made without departing from the scope and spirit of the invention.

What is claimed is:

1. A controller grip for a video game controller, said video game controller having a left handle section, a right handle section, and a center handle section, said controller grip comprising a covering material having a first portion for covering said left handle section, a second portion for covering said right handle section, a third portion for covering said center handle section, a strap portion having a front end and a back end, the front end of said strap portion being attached to said third portion, a left wrap around portion connecting said first portion to the back end of said strap portion and a right wrap portion connecting said second portion to the back end of said strap portion.

2. The controller grip of claim 1 wherein the back end of said strap portion is shaped to form a loop engageable with said video game controller.

3. The controller grip of claim 1 wherein said covering material has a resilient cushion surface.

4. The controller grip of claim 1, said covering material further comprising contour grooves for conforming to a user's fingers.

5. The controller grip of claim 1 further comprising finger straps affixed to said covering material.

6. The controller grip of claim 1 wherein said covering material is selected from the group consisting of leather, rubber, neoprene, vinyl and cloth.

7. A controller grip for a video game controller of the type having a left section, a right section and a central section connecting the left section and the right section and action control buttons, said controller grip comprising a covering material shaped to conform to said left section, said right section and said central section and shaped to form cut out portions for said action control buttons, and finger straps affixed to said covering material wherein said covering material is securable to the video game controller.

8. A controller grip for a video game controller having action control buttons and selection control buttons, said controller grip comprising:

a covering material securable to the controller, said covering material being sized and configured to cover said controller such that the action control buttons and selection control buttons remain exposed for use when said controller grip is secured to said controller, and finger straps affixed to said covering material.

9. The controller grip of claim 1 wherein said covering material comprises an elastic material elastically securable to said controller.

10. The controller grip of claim 1 wherein said covering material has a resilient cushion surface.

11. The controller grip of claim 1 wherein said covering material is secured to the controller by hook and loop fastening strips.

12. The controller grip of claim 1, said covering material further comprising bumps to facilitate gripping said controller grip.

13. The controller grip of claim 1 wherein said covering material is selected from the group consisting of leather, rubber, neoprene, vinyl and cloth.

14. The controller grip of claim 1 wherein said covering material has finger grooves for conforming to a user's fingers.

15. A controller grip for a video game controller of the type having a left section, a right section and a central section connecting the left section and the right section and action control buttons, said controller grip comprising a covering material shaped to conform to said left section, said right section and said central section and shaped to form cut out portions for said action control buttons and finger straps affixed to said covering material wherein said covering material is securable to the video game controller.

16. The controller grip of claim 15 wherein said covering material is made of an elastic material that is smaller than said video game controller when the covering material is in its relaxed state.

17. The controller grip of claim 15 wherein said covering material has a resilient cushion surface.

18. The controller grip of claim 15 wherein said covering material is selected from the group consisting of leather, rubber, neoprene, vinyl and cloth.

19. The controller grip of claim 15 wherein said covering material has finger grooves for conforming to a user's fingers.

* * * * *